(12) United States Patent
Takeno et al.

(10) Patent No.: US 7,789,396 B2
(45) Date of Patent: Sep. 7, 2010

(54) OIL SEAL AND PROCESS FOR PRODUCING THE SAME

(75) Inventors: Kazuki Takeno, Nihonmatsu (JP);
Hideyuki Huruyama, Fukushima (JP);
Masayuki Tanida, Fukushima (JP);
Hiroki Matsui, Fukushima (JP);
Tatsuhiko Watanabe, Fukushima (JP);
Shinobu Munekata, Fukushima (JP);
Akira Yamaguchi, Fukushima (JP);
Hirotaka Mizuta, Fujisawa (JP);
Kenichi Kunieda, Fujisawa (JP);
Toshihiro Higashira, Fujisawa (JP)

(73) Assignee: NOK Corporation (JP)

( * ) Notice: Subject to any disclaimer, the term of this patent is extended or adjusted under 35 U.S.C. 154(b) by 157 days.

(21) Appl. No.: 11/922,634

(22) PCT Filed: Dec. 14, 2005

(86) PCT No.: PCT/JP2005/022922

§ 371 (c)(1),
(2), (4) Date: Dec. 20, 2007

(87) PCT Pub. No.: WO2006/137182

PCT Pub. Date: Dec. 28, 2006

(65) Prior Publication Data

US 2009/0200750 A1 Aug. 13, 2009

(30) Foreign Application Priority Data

Jun. 21, 2005 (JP) ............................. 2005-180964

(51) Int. Cl.
*F16J 15/32* (2006.01)
(52) U.S. Cl. ..................................... 277/569
(58) Field of Classification Search ............. 277/562, 277/569, 564
See application file for complete search history.

(56) References Cited

U.S. PATENT DOCUMENTS 4,867,926 A 9/1989 Matsushima
2006/0252234 A1* 11/2006 Saiki ........................ 438/464

FOREIGN PATENT DOCUMENTS

JP 62-297569 A 12/1987

(Continued)

OTHER PUBLICATIONS

International Search Report (in English), Written Opinion of the International Searching Authority (in Japanese) for PCT/JP2005/022922, dated Mar. 3, 2006 and International Preliminary Examination Report (in Japanese) for PCT/JP2005/022922, dated Apr. 13, 2007; ISA/JPO.

*Primary Examiner*—Thomas B Will
*Assistant Examiner*—Gilbert Y Lee
(74) *Attorney, Agent, or Firm*—Harness, Dickey & Pierce, P.L.C.

(57) ABSTRACT

This invention provides an oil seal that can maintain an excellent friction reduction function over a long period of time, has excellent abrasion resistance, and further has excellent sealing properties. The oil seal comprises a seal lip (4) formed of a rubber-like elastic material comprising a lip edge part (9) and an air-side slope (8) and a sealing fluid-side slope (10) provided on both sides of the lip edge part (9). The air-side slope (8) has a coating film (14) on its surface. In the lip edge part (9) in its portion in contact with a shaft (13), a sealing fluid-side rubber part (2') and an air-side coating film (14) are simultaneously brought into contact with the shaft (13). The coating film (14) is preferably formed of a coating agent comprising a fluororesin, a polyethylene resin, an isocyanate-modified polybutadiene resin, and a solvent.

1 Claim, 8 Drawing Sheets

FOREIGN PATENT DOCUMENTS

| | | |
|---|---|---|
| JP | 63-008428 A | 1/1988 |
| JP | 5-57523 U | 7/1993 |
| JP | 6-16999 A | 1/1994 |
| JP | 6-16771 U | 3/1994 |
| JP | 6-35740 U | 5/1994 |
| JP | 07-217746 A | 8/1995 |
| JP | 08-048800 A | 2/1996 |
| JP | 09-068011 A | 3/1997 |
| JP | 3316993 B2 | 6/2002 |
| JP | 2003-213122 A | 7/2003 |

* cited by examiner

Sliding face deformation model (Kammuller)

Kamuller

Muller

Circulating Flow Model

Image view of seal sliding face of present invention

OIL SEAL AND PROCESS FOR PRODUCING THE SAME

CROSS-REFERENCE TO RELATED APPLICATIONS

This is a national stage of the International Application No. PCT/JP2005/022922 filed Dec. 14, 2005 and published in Japanese.

BACKGROUND OF THE INVENTION

1. Field of the Invention

The present invention relates to an oil seal which is a kind of a sealing apparatus, and a process for producing the same.

2. Description of the Conventional Art

As for a conventional process for reducing sliding resistance of a seal lip in an oil seal, (1) a process for reducing press force with respect to a shaft which is opposite in sliding, and (2) a process for reducing a friction coefficient of a lip slide part have been known.

However, as for the process (1), since a lip length is set to be short according to reduction of press tension force with respect to a shaft, a lip design to have following-up property to the shaft under high eccentricity in well balanced state is hard, and thus there is a problem that sliding resistance cannot be largely reduced. Further, as for the process (2), a process to coat various kinds of a film on a lip slide part has been considered. However, there is a problem that sliding resistance may increase in a quite early stage due to an initial abrasion of a coated film.

Further, as for a process to attach a fluororesin sheet to a lip slide part, there is a problem in durability of attachment between a lip base material rubber and the resin sheet so that sealing property may be damaged (refer to Japanese Utility Model Publication No. H6-16771 and Japanese Utility Model Publication No. H5-57523).

Further, as for a process to coat a lip slide part with polytetrafluoroethylene (PTFE), since PTFE is not chemically reacted on a rubber surface, binding property to a rubber is inferior, and thus durability cannot be obtained (refer to Japanese Utility Model Publication No. H6-35740 and Japanese Patent Application Laid Open No. H9-68011). In addition, surface hardness of a rubber may increase so as to increase surface roughness, and thus sealing property may be damaged (refer to Japanese Patent Application Laid Open No. H8-48800).

Further, an oil seal made by coating a resin layer, which is made by binding a dispersing element as a solid lubricating agent with a binding resin (a binder), on an air side slope in a lip slide part has been known. However, this conventional technique provides a structure in which a lip slide part contacts to a shaft by only a resin layer in order to reduce a friction coefficient. Thus, a contacting state of a lip slide part to a shaft is unstable, and thus there is a problem that a sealing property may decrease. Further, in this conventional technique, the binder is a polyimide resin or an epoxy resin. However, these resins are conventionally used for processing a fluororesin. Thus, when these resins are used on the surface of a seal lip made of a rubber like elastic material, a coating layer becomes to be hard, and thus there is a problem in durability (generation of breaking or peeling of the coating layer) at the time of sliding (refer to Japanese Patent Application Laid Open No. H7-217746).

In addition, although present inventors provide various kinds of a coating layer applied for a lip slide part, all of these coating layers are different from the content of the present invention (refer to Japanese Patent Application Laid Open No. S63-8428, Japanese Patent No. 3,316,993 and Japanese Patent Application Laid Open No. 2003-213122).

SUMMARY OF THE INVENTION

Problems to be solved by the Invention

To solve the above-described problems, an objective of the present invention is to provide an oil seal capable of maintaining an excellent friction reduction function over a long period of time, having excellent abrasion resistance, and further having excellent sealing property.

Means for solving the problems

In order to achieve the above-described objectives, according to a first aspect of the present invention, an oil seal has a seal lip made of a rubber like elastic material and provided with an air-side slope and a sealing fluid-side slope on both sides of a lip edge part, wherein the air-side slope has a coating film on the surface thereof, and a portion in contact with a shaft in the lip edge part is so made that a sealing fluid-side rubber part and an air-side coating film simultaneously contact with the shaft.

Further, according to a second aspect of the present invention, the coating film in the oil seal of the first aspect is preferably formed of a coating agent including a fluororesin, a polyethylene resin, an isocyanate-modified polybutadiene resin, and a solvent.

As described above, a process to reduce sliding resistance of a seal lip in an oil seal is a process to reduce press force with respect to a shaft, or a process to reduce a friction coefficient of a lip slide part. As the later process, a process to vapor-deposit, apply or attach a material having a low friction coefficient, e.g., PTFE, on the surface thereof so as to form a coating film has been considered. On the other hand, a lip slide part is an important portion having a sealing function. However, since only a coating film coated on a lip slide part contacts to a shaft according to the conventional method, excellent sealing property, which a seal lip made of a rubber like elastic material inherently has, may be damaged. Therefore, the present invention provides a method to reduce torque and a low torque seal based on lubrication of a seal and a seal structure.

A seal sliding face is considered to be in a fluid lubricating state in which a shaft and a seal lip are separated by a sealing fluid (e.g., oil). However, a recent research clarifies that a film thickness of the fluid is not uniform on the whole sliding face, and an oil film becomes to be thin from the sealing fluid side (the oil tank side) toward the air side (the reference document: TRIBOLOGIST 48, 6 (2003)494). A main factor of friction torque of a seal is considered to be searing force according to rotation of a shaft, and the shearing force is in inverse proportion to the oil film thickness. That is, since a friction torque of a seal is largely influenced by the air side having a thin oil film thickness, it is considered that reduction of a friction coefficient of the portion at the air side is effective to reduce a whole torque.

On the other hand, as for a sealing operation of a seal, it is necessary that the sliding face has proper roughness and pressure distribution of contact points is deviated on the sealing fluid side. Such operation is described with models as illustrated in FIG. 1 (a model of a modified sliding face) and FIGS. 2(a) and 2(b) (a model of a circulating flow). That is, it is considered that the sealing operation is generated by the roughness of a sliding face with macro and micro-level contact pressure distribution. Therefore, formation of a film of a low friction material, such as PTFE, on a sliding face should be made without affecting them as much as possible. In order to realize this condition, it is considered to make the film thickness to be fully thinner than the roughness of a seal, or to coat a film on a part only of a sliding face. However, in the case of the former process, for example, since the roughness of a sliding face of a seal for rotation is a few microns, the film thickness is of the submicron order. Thus, there are problems in durability and the effect to reduce torque. Therefore, the later process, that is, the process to coat a film of a low friction material on a part only of a sliding face is desirable, and it is proper that the part coated with the film is on the air side of a sliding face so as to reduce torque, as described above.

Accordingly, torque can be reduced with keeping the sealing property by forming the state in which a film of a low friction material such as PTFE is formed only on the air side of a sliding face, that is, by forming the state in which a most part of a sliding face width L is contacted with a rubber in general as illustrated in FIG. 3 (a rubber area is illustrated with $L_1$) and only a part on the air side is contacted with a film of a low friction material (a film area is illustrated with $L_2$), from viewpoints of a seal function and a lubrication function. (In addition, in FIG. 3, a symbol 4 indicates a rubber seal lip, 8 indicates an air-side slope, 9 indicates a lip edge part, 10 indicates a sealing fluid-side slope, 13 indicates a shaft, 14 indicates a film, and an arrow B indicates a sliding direction.) In order to realize this state, it is necessary that a film coated on the surface is strongly bound with a base material, and the hardness is not too higher than that of a rubber. When the binding property is low, the film is easily peeled and fallen at the time of sliding, and thus durability is inferior. When the hardness of the film is high, the film gives bad influence to a macro-level contact pressure distribution of a sliding face, and thus sealing property decreases.

Effectiveness of the Invention

Therefore, when an area to form a film is limited on the surface at the lip air side from viewpoints of a seal function and a lubrication function, torque of a seal can be effectively reduced while a seal function being kept. The reason of this is that the roughness of a sliding face which is important for a seal function is kept as much as possible by forming a film of a low friction material on the air side where torque on a sliding face is much influenced and by limiting formation of the film in a narrow area on the air-side surface, and that the macro-level contact pressure distribution is not adversely influenced as the result of the hardness of a film being made low. Furthermore, a film having excellent binding property is formed on the air-side slope of a lip. Therefore, even when abrasion advances, low torque property can be kept for a long period of time since a film of a low friction material is formed on the air side of a sliding face.

Further, according to the present invention, since an isocyanate-modified polybutadiene resin chemically reacts to a functional group of a lip base material rubber, peeling or falling of the fluororesin (PTFE) and the coating film is suppressed. Further, since the coating film is formed by a thermal treatment, binding property between a lip base material rubber and the coating film is strong. Furthermore, a low friction can be realized by the fluororesin (PTFE) and a polyethylene resin, and increasing of the surface hardness can be suppressed by a polybutadiene resin and a polyethylene resin. Thus, the surface roughness does not increase, and sealing property is not damaged.

Therefore, a coating film is not easily peeled by a sliding friction, and low friction property can be kept for a comparatively long period of time. Further, a rubber hardness and a surface roughness are hardly varied, and a low friction can be achieved without changing a lip shape. Thus, a low friction can be realized while a basic seal property being kept. Furthermore, since the effect to reduce friction is remarkable, heat generation by sliding is reduced. Thus, thermal deterioration of oil to be sealed and a lip base material rubber can be suppressed, and an oil seal having a longer life can be provided.

DETAILED DESCRIPTION OF PREFERRED EMBODIMENT

Figure 1:
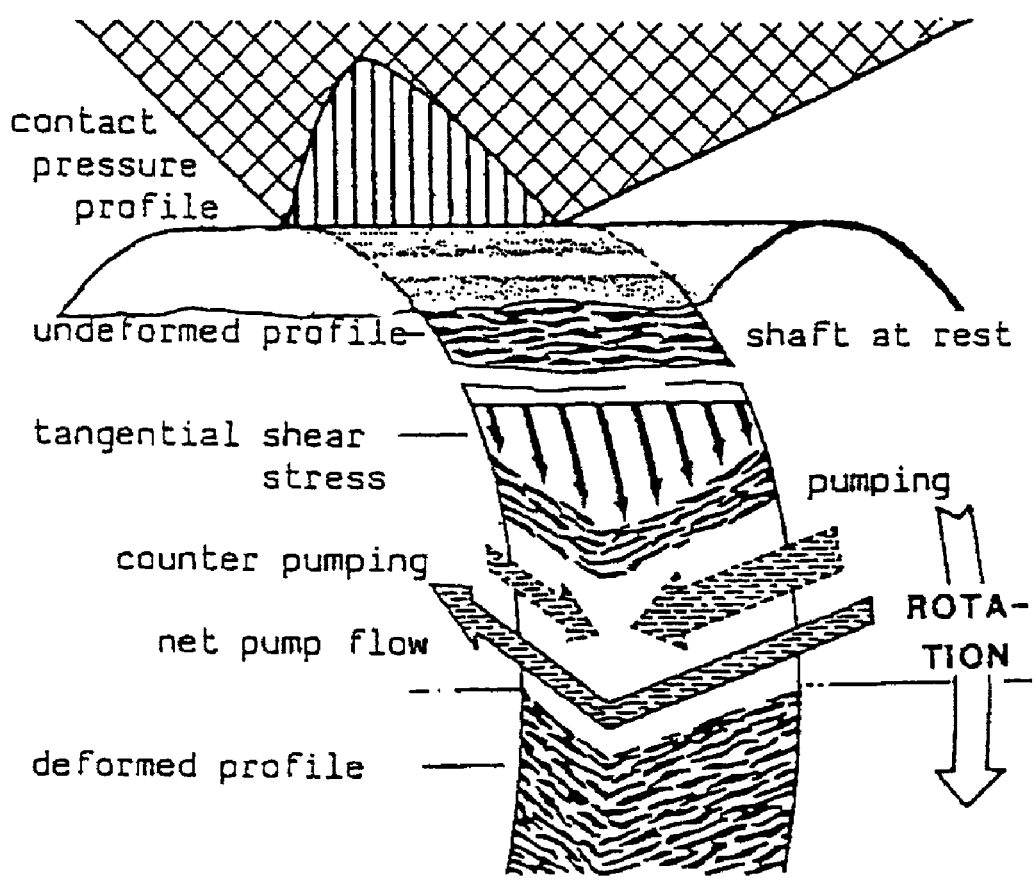
FIG. 1 is a descriptive view of a model of a modified sliding face.
Figure 2A:
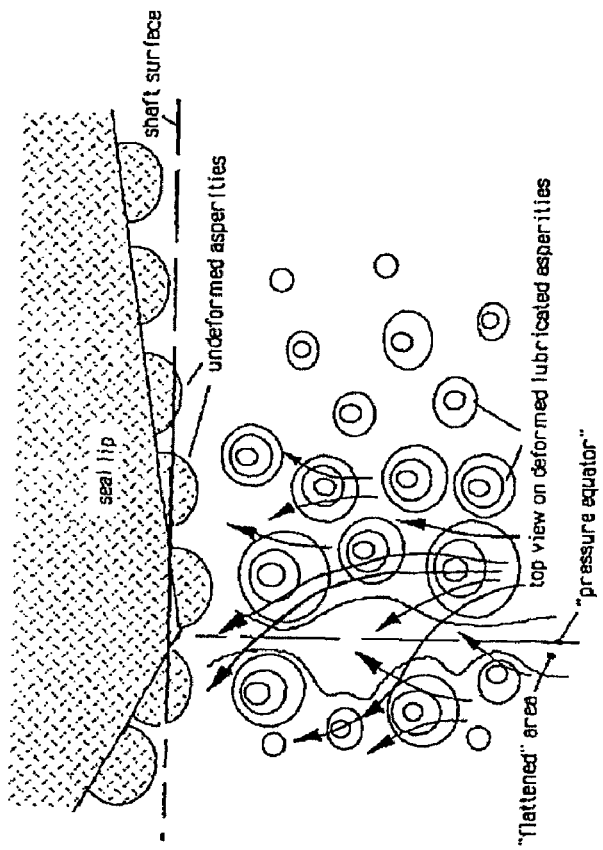
FIGS. 2(a) and 2(b) are a descriptive view of a model of a circulating flow.
Figure 2B:
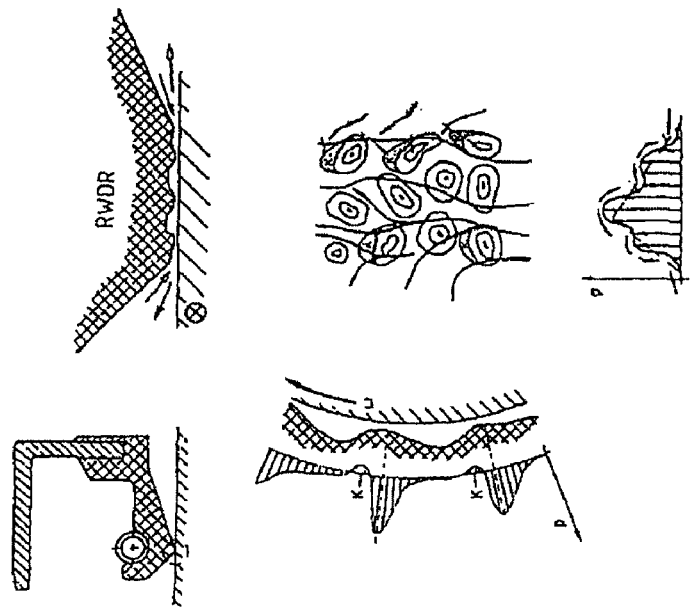
Figure 3:
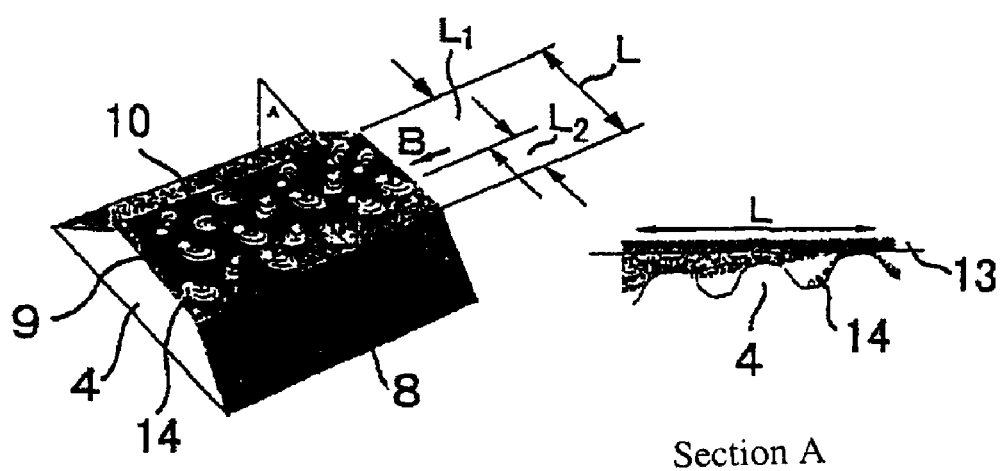
FIG. 3 is a descriptive view of an image of a sliding face.

The present invention includes the following embodiments

Embodiment 1

In order to prevent faults in the conventional methods, a method to coat a lip sliding face with a low friction coating film, which has strong bonding force to a base material and does not make initial peeling due to sliding, will be described below.

(1) A solution is made by blending a component binder (an isocyanate-modified polybutadiene resin), which is strongly bonded with a rubber base material, with PTFE, and diluting the mixture with a solvent.

(2) The solution made in the above (1) is sprayed and applied on the air-side of the lip sliding face before being subjected to knife-cutting.

(3) The coated solution is dried and hardened by air heating.

(4) After the treatment of the above (3), a main lip is subjected to a finishing treatment by knife-cutting.

By using the processes to apply a coating agent, thermal treatment, and finishing of a main lip as described in the above (2) to (4), a coated surface can be formed on only an air-side sliding face.

Embodiment 2

A method to realize reducing of friction of a seal lip in an oil seal includes a process to apply a coating liquid, which includes a fluororesin, a polyethylene resin, an isocyanate-modified polybutadiene resin, and a solvent, on an air-side sliding face of a seal lip, a process to bake and dry the liquid after the coating process, and a process forming a sealing fluid-side sliding face of a seal lip by knife-cutting after the drying process.

Embodiment 3

In the present invention, a detail description of a coating film to be properly used is as follows.

A coating agent for a vulcanized rubber made of an organic solvent solution is applied on the air-side slope of a lip sliding part. The organic solvent solution respectively includes 10 to 160 weight parts of a polyethylene resin and 10 to 160 weight parts of a fluororesin with respect to 100 weight parts of isocyanate group-containing 1,2-polybutadiene or a 1,2-polybutadiene mixture made by blending hydroxyl group-containing 1,2-polybutadiene with the isocyanate group-containing 1,2-polybutadiene.

Isocyanate group-containing 1,2-polybutadiene, which is added with an isocyanate group as a terminal end group and has a molecular weight of about 1,000 to 3,000, is used. A commercial product, e.g., NISSO TP-1001 produced by NIPPON SODA CO., LTD (a solution containing 50% by weight of butyl acetate) can be used as the isocyanate group-containing 1,2-polybutadiene. The polybutadiene resin has more excellent compatibility with a rubber than that of a polyurethane resin which is similarly reacted with an isocyanate group so as to be polymerized, so that the polybutadiene resin has excellent bonding property to a rubber. Further, the polybutadien has particularly excellent friction and abrasion resistance.

Further, the isocyanate group-containing 1,2-polybutadiene is added with an isocyanate group as a terminal end group. Thus, the isocyanate group-containing 1,2-polybutadiene can be polymerized by reacting with a functional group on the surface of a vulcanized rubber or hydroxyl group-containing 1,2-polybutadiene, and can be used as a curing agent for hydroxyl group-containing 1,2-polybutadiene. Hydroxyl group-containing 1,2-polybutadiene added with a hydroxyl group as a terminal end group, which is used in this case, has a molecular weight of about 1,000 to 3,000. A commercial product, e.g., NISSO G1000, C-1000, GQ-1000 and GQ-2000 produced by NIPPON SODA CO., LTD, can be used as it is. When isocyanate group-containing 1,2-polybutadiene and hydroxyl group-containing 1,2-polybutadiene are used by mixing, isocyanate group-containing 1,2-polybutadiene is 25% or more by weight, and preferably 40 to 100% by weight, and hydroxyl group-containing 1,2-polybutadiene is 75% or less by weight, and preferably 0 to 60% by weight. When the amount of isocyanate group-containing 1,2-polybutadiene is less than the above-described range, bonding property to a rubber decreases, so that smoothness decreases and friction and abrasion resistance decreases.

The polyethylene resin can be a commercial resin. The fluororesin can be polytetrafluoroethylene (PTFE), a tetrafluoroethylene/hexafluoropropylene copolymer, a tetrafluoroethylene/perfluoro(alkyl vinyl ether) copolymer, polyvinylidene fluoride, polyvinyl fluoride, or an ethylene/tetrafluoroethylene copolymer. Preferably, polytetrafluoroethylene (PTFE) can be used. The fluororesin particles are made by classifying a fluororesin, which is made by bulk polymerization, suspension polymerization, solution polymerization or emulsion polymerization, to obtain those having particle diameter of about 0.1 to 5 μm, are made by dispersing a dispersion liquid to be a fine particles of about 0.1 to 5 μm by shearing and stirring the dispersion liquid made by a suspension polymerization, solution polymerization, or emulsion polymerization, or are made by dry-pulverizing or cool-pulverizing the products made by the above-described polymerization, to obtain those having fine particles of 10 μm or less after coagulating and drying. As for the particle diameter set to be 0.1 to 10 μm, when the particle diameter is smaller, a coat thickness can be thinner, and thus there is a merit of not decreasing seal property. However, a contacting area becomes smaller, and thus a friction coefficient may increase. On the other hand, when the particle diameter is larger, a coat thickness becomes thicker, and thus seal property may be damaged. However, a contacting area with an opposite material becomes smaller, and thus a friction coefficient decreases. Therefore, the particle diameter is properly adjusted according to a requirement of use. The particle diameter is determined depending on seal property in case of an oil seal part, and is preferably about 0.5 to 5 μm. As for the polyethylene resin, similar particle diameter to that of the fluororesin is preferable.

A solution made by mixing 10 to 160 weight parts of a polyethylene resin and 10 to 160 weight parts of a fluororesin with respect to 100 weight parts of 1,2-polybutadiene in an organic solvent is used. When the ratio of the polyethylene resin is more than the above-described range, bonding property to a rubber, and friction and abrasion resistance decrease. When the ratio is less than the above-described range, seal property and smoothness decrease. Further, when the ratio of the fluororesin is more than the above-described range, bonding property to a rubber, friction and abrasion resistance and seal property decrease, flexibility of a coated film is damaged, and thus crack generates on a cured coated film. When the ratio is less than the above-described range, smoothness decreases. Preferably, the solution includes 25 to 120 weight parts of the polyethylene resin and 25 to 120 weight parts of the fluororesin.

The organic solvent can be toluene, xylene, ethyl acetate, butyl acetate, methyl ethyl ketone or methyl isobutyl ketone, and a conventional commercial solvent can be used as it is. The diluting amount of an organic solvent is properly selected according to a coat thickness. The coat thickness is generally 1 to 10 μm, and preferably 2 to 7 μm. When the coat thickness is less than the above-described range, the whole irregularities on a rubber surface cannot be covered, and smoothness may be damaged. When the coat thickness is more than the above-described range, rigidity of a coat surface increases, and thus seal property and flexibility may be damaged.

A rubber capable of being treated with the coating agent can be a general rubber material such as a fluororubber, a nitrile rubber, a nitrile rubber hydride, an ethylene-propylene rubber, a styrene-butadiene rubber, an acrylic rubber, a chloroprene rubber, a butyl rubber, or a natural rubber. Preferably, a rubber material having few blooming of an antioxidant and oil, which are blended in a rubber, to a rubber surface layer is used. In addition, a blending ratio of each of the above-described components, the kind of an organic solvent, the amount of an organic solvent, and the ratio of mixing of an organic solvent are properly selected according to the kind of a rubber material and the object.

A coating method to an oil seal can be a spray, a roll coater, a flow coater, or an ink jet. If an outer peripheral portion of an oil seal is coated, the oil seal cannot be fixed after mounting, and thus only a seal lip is partially coated. A coating method is not limited to these methods, but spray coating is preferable because of easy partial coating.

Embodiment 4

Figure 4:
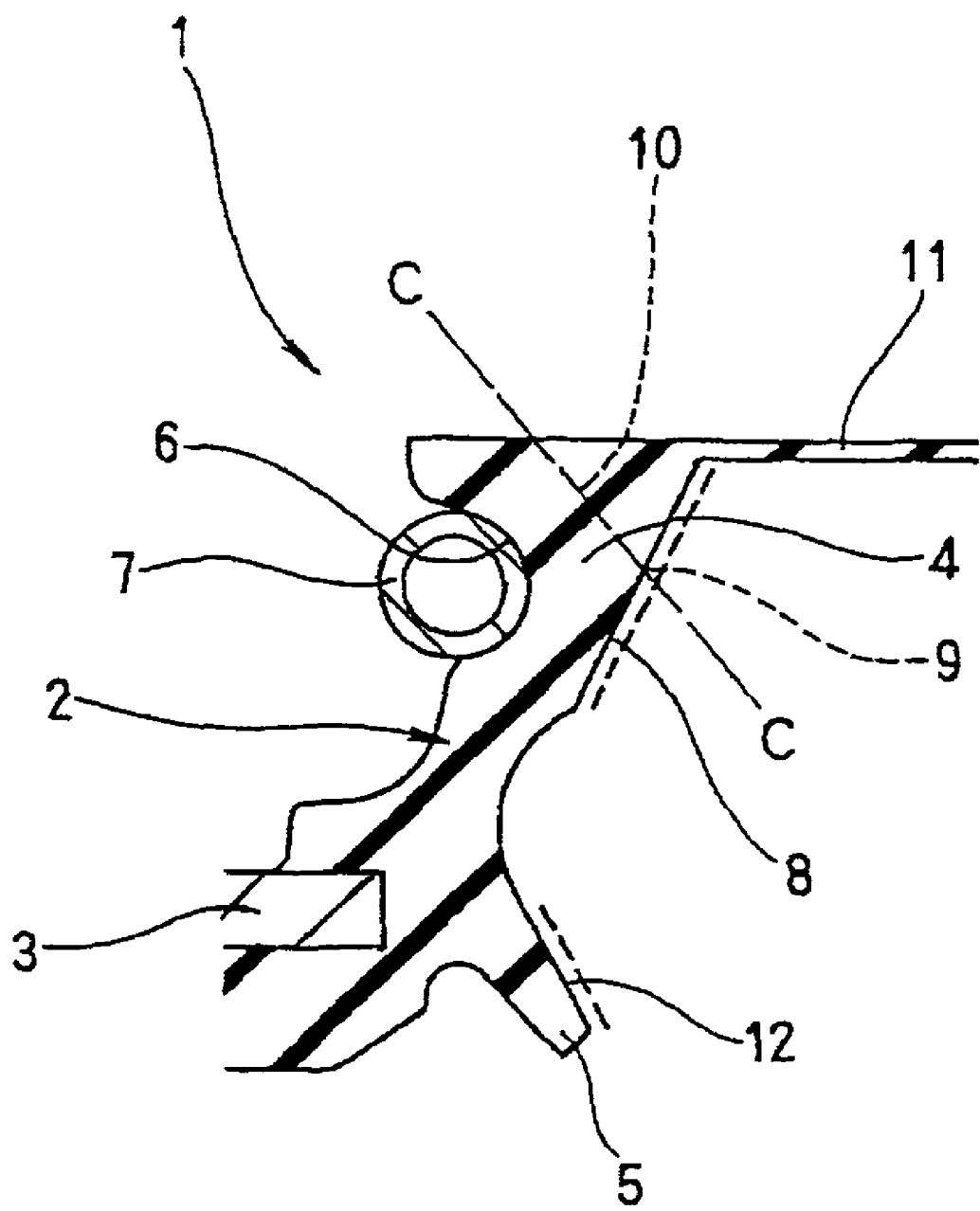
FIG. 4 is a cross sectional view of a main part to illustrate a producing process of an oil seal according to an embodiment of the present invention.

FIG. 4 illustrates a cross sectional view of a main part of an oil seal 1 according to this embodiment, and the oil seal 1 can be produced as follows.

A rubber elastic body part shown with a symbol 2 is molded by using a mold and a fluororubber as a molding material. A rubber elastic body part 2, which is bonded (vulcanization-bonded) to a metal ring 3 simultaneously when molded, includes a main lip (seal lip) 4 to mainly seal a sealing fluid (seal medium), and a dust lip 5 to mainly seal an external dust. The main lip 4 includes a mounting groove 6 for a garter spring 7. Further, a sliding part of the main lip 4 includes an air-side slope 8 (air-side sliding face) However, a lip edge part 9 and a sealing fluid-side slope 10 (sealing fluid-side sliding face), which is at the opposite side in an axial direction beyond the lip edge part 9, are formed by knife-cutting C which is carried out after molding. A burr part 11 is integrally molded at those parts in the molding stage by the mold.

In addition, a coating agent is prepared separately from the above process, and the coating agent is applied on the air-side slope 8 of the main lip 4 and on the sealing fluid-side slope 12 of the dust lip 5 after the molding. The coating agent includes fluororesin, a polyethylene resin, an isocyanate-modified polybutadiene resin and a solvent. A coat thickness is about 2 to 20 μm. In the figure, coating areas are illustrated with dotted lines. When the coat thickness is smaller than the above-described range, friction is not reduced, and when the coat thickness is larger than the above-described range, sealing fluid may leak.

Then, the applied coating liquid is chemically bonded on the slopes 8 and 12 by drying for 1 minute to 24 hours at 150 to 250° C. and subjecting to a curing treatment. The burr part 11 is cut and removed by knife-cutting C, and the lip edge part 9 and the sealing fluid-side slope 10 are formed on the main lip 4. Since the coating agent is not applied on the sealing fluid-side slope 10, the coating film is formed on only the air-side slope 8.

Figure 5:
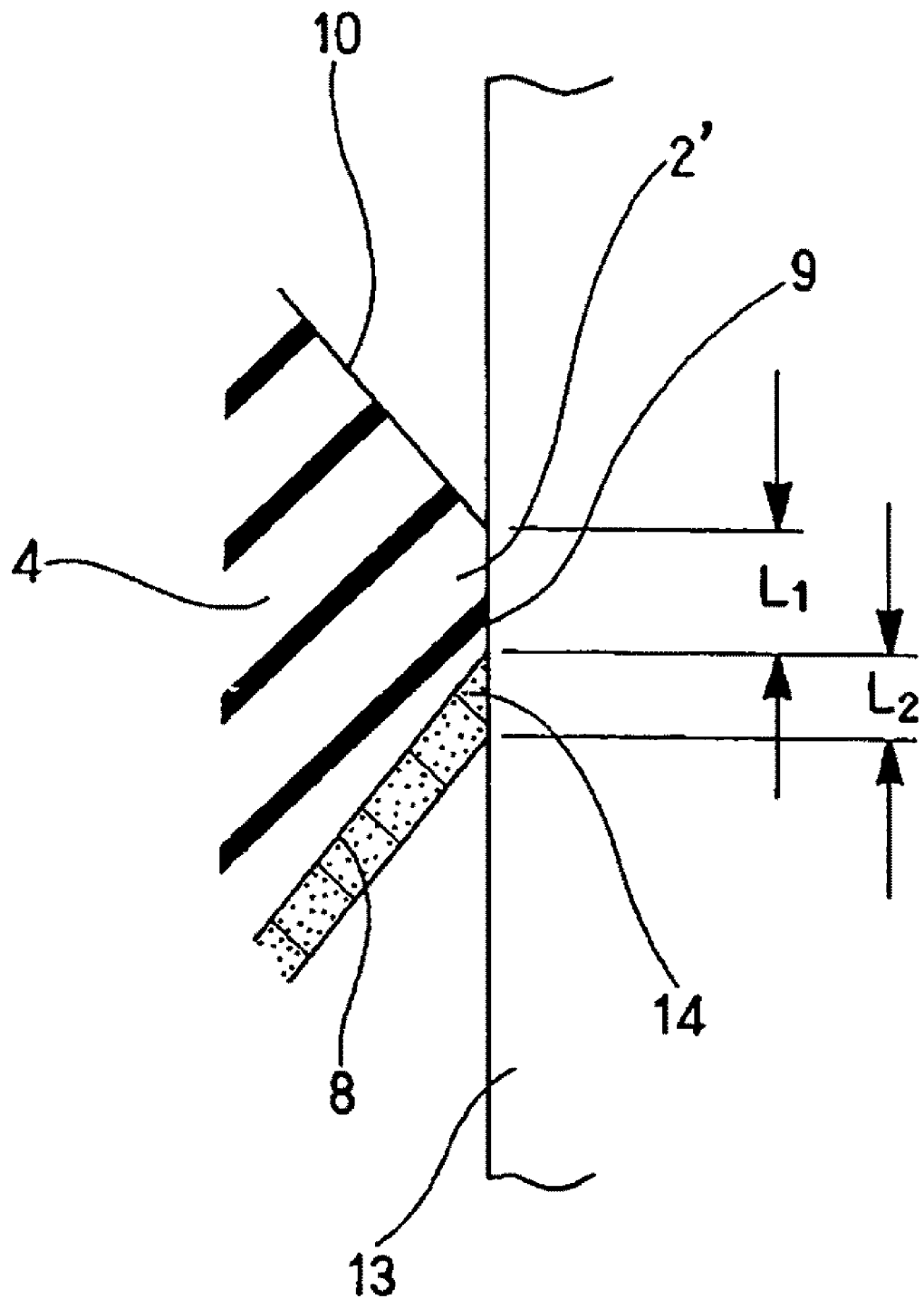
FIG. 5 is an enlarged cross sectional view of a main part of an oil seal to illustrate the state that the oil seal contacts to a shaft.

Further, at a portion in contact with a shaft 13 in the lip edge part 9, as illustrated enlargedly in FIG. 5, a sealing fluid-side rubber part 2' which is a part of rubber elastic body part 2 (the surface of the sealing fluid-side slopes 10), and an air-side coating film 14 simultaneously contact to the peripheral face of the shaft 13 while having predetermined contact widths (a contact width of the rubber portion 2' is $L_1$, and a contact width of the coating film 14 is $L_2$).

When temperature of the curing treatment is lower than above-described ranges of 150 to 250° C. and time of the curing treatment is shorter than above-described range of 1 minute to 24 hours, bonding property to a rubber and curing of the film are insufficient. Thus, reducing of friction or abrasion resistance (low friction keeping property) is damaged. Preferably, drying and curing treatment are carried out at 150 to 250° C. for 5 minutes to 15 hours. Further, when temperature and time to carry out the curing treatment are higher and longer than the above-described ranges, deterioration of the hardening of the film and the rubber advances, and leakage of sealing fluid occurs. Thus, seal property is damaged. Therefore, it is necessary that heating temperature and heating time are properly set according to heat resistances of various kinds of a base material. For drying and curing treatment, a commercial apparatus, e.g., a sealed type oven and a continuous tunnel furnace, which are a general air heating type, can be used.

According to the oil seal 1 produced by the above-described processes, the coating film 14 is strongly bonded with the slopes 8 and 12 coated with the coating film 14. Thus, the coating film 14 is not easily peeled due to sliding friction to the shaft 13, and can keep low friction property for a comparatively long period of time. Further, since reduced friction can be realized without changing the shape of each of lips 4 and 5, reduced friction can be realized while basic seal property being kept. The effect to reduce friction can be realized −30 to −60% in comparison with a product which is not coated. Further, since the effect to reduce friction is remarkably high, a heat generated by sliding is reduced. Thus, heat deterioration of oil, which is sealing fluid, or a lip base material rubber can be suppressed, so that the oil seal 1 having longer life can be provided. Furthermore, when the main lip 4 is preferably subjected to knife-finishing processing after coating with the coating agent, the sharpness of the lip edge part 9 can be sufficiently kept, and thus proper seal property can be exercised.

Embodiment 5

In summary, the present invention is characterized in that a coating agent is not applied on a lip surface at the sealing fluid side from a lip sliding part.

Further, in the embodiment 4, the characteristic of the present invention is satisfied by knife-cutting C after applying the coating agent. However, even in a case of applying the coating agent after knife-cutting C, the similar effect can be obtained by a process that the coating agent is applied on only the air-side slope 8 in the state of masking the seal fluid-side slope 10 of the lip 4, or a process that the coating agent is partially applied with a brush on only the air-side slope 8. Thus, the present invention includes these processes. Therefore, the following two types of processes are considered as producing processes.

Producing Process 1

A process for producing an oil seal according to the first or second aspect includes a process to apply a coating agent on the air-side slope 8 of a seal lip 4, which has a burr part 11 and includes the air-side slope 8, a process to cure the coating agent by a heating treatment after applying the agent so as to form a coating film 14, and a process to form a lip edge part 9 and a sealing fluid-side slope 10 by knife-cutting C after forming the coating film 14.

Producing Process 2

A process for producing an oil seal according to the first or second aspect includes a process to apply a coating agent on only the air-side slope 8 of a seal lip 4, which includes an air-side slope 8, a lip edge part 9 and a sealing fluid-side slope 10, and a process to cure the coating agent by a heating treatment after applying the agent so as to form a coating film 14.

In addition, in the producing process 2, when a coating agent is applied on only an air-side slope 8 in the state of masking a sealing fluid-side slope 10 of a seal lip 4, the following process is preferable to mask the sealing fluid-side slope 10.

Figure 6:
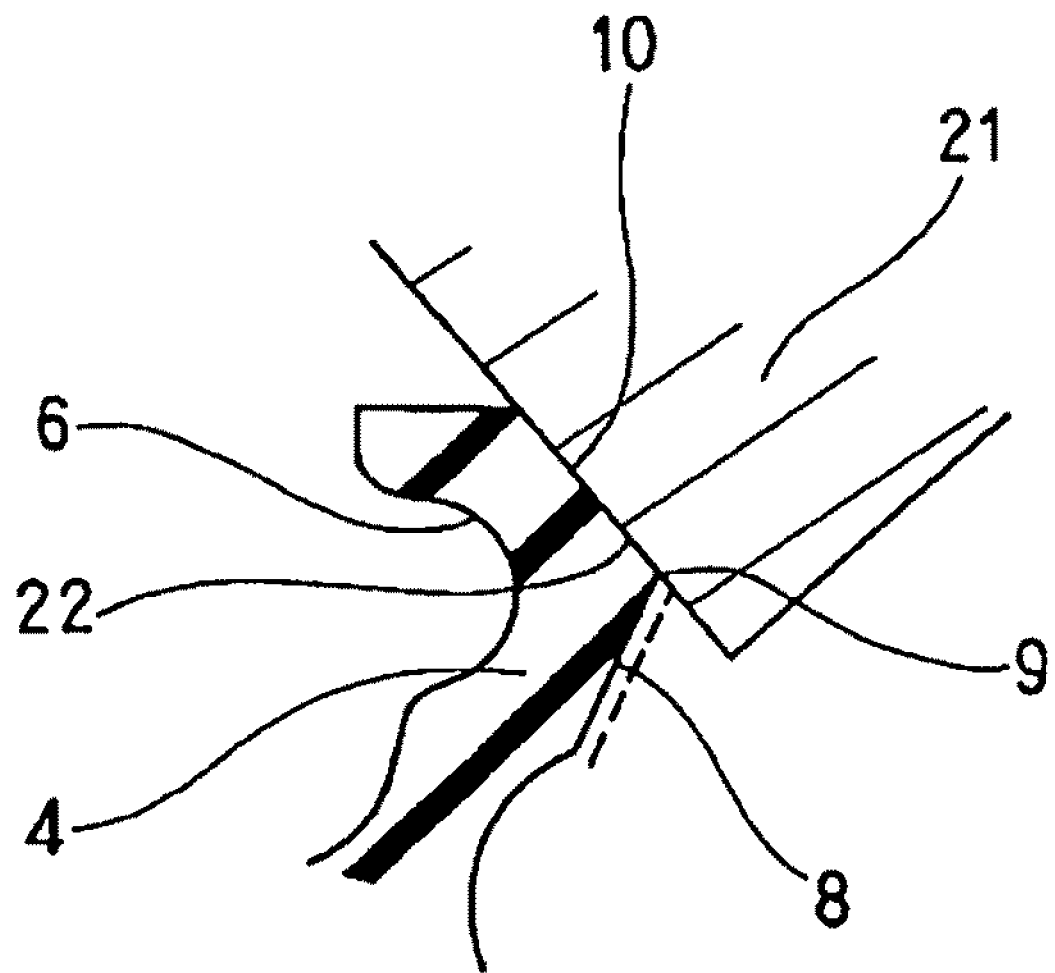
FIG. 6 is a cross sectional view of a main part of an oil seal to illustrate one example of a masking method.

As illustrated in FIG. 6, the sealing fluid-side slope 10 is masked using a masking jig 21 which contacts to the sealing fluid-side slope 10 of the seal lip 4 to cover it, and then a coating agent is applied on the air-side slope 8 of the seal lip 4. The masking jig 21 illustrated in FIG. 6 has an annular slope 22 which contacts to and covers the whole face of the sealing fluid-side slope 10 of the seal lip 4.

Figure 7A:
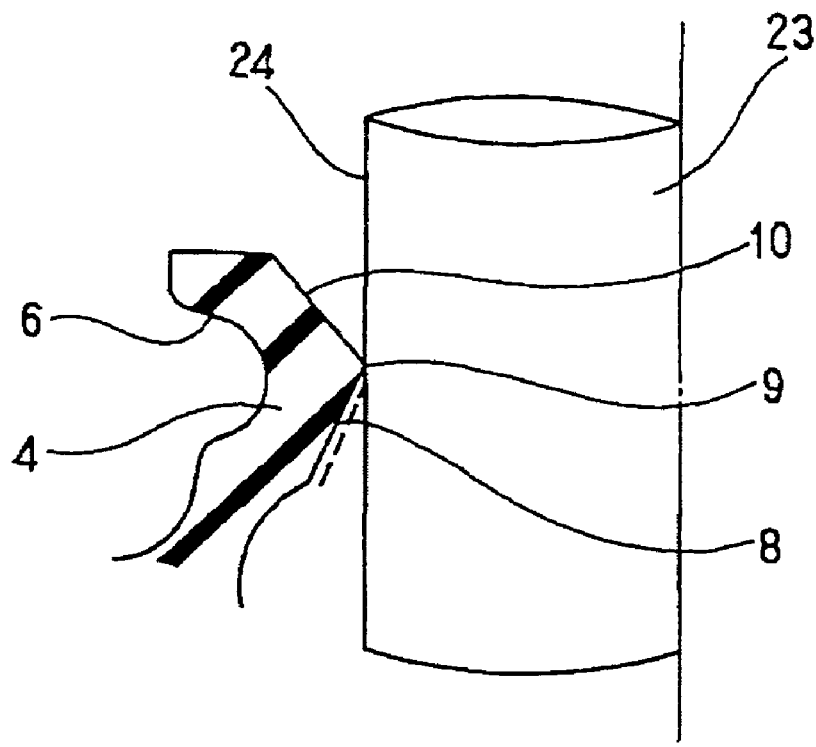
FIGS. 7(A) and 7(B) are cross sectional views of a main part of an oil seal to illustrate other examples of a masking method.
Figure 7B:
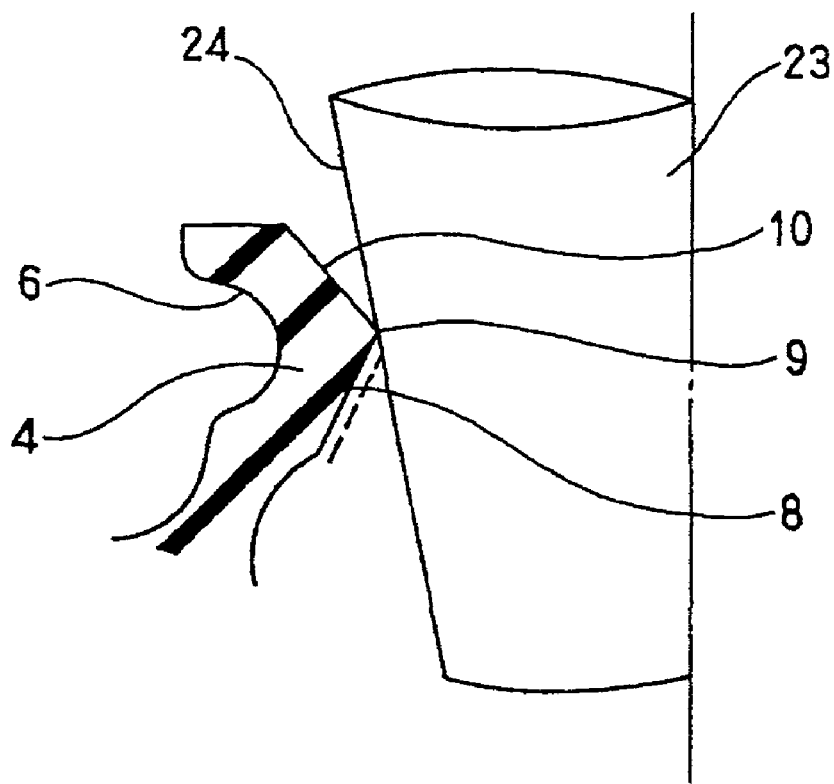

Or, as illustrated in FIGS. 7(A) or 7(B), the seal lip 4 is fitted to a shaft type masking jig 23 having a cylindrical or conical surface 24, and then a coating agent is applied on the air-side slope 8 of the seal lip 4. As the shaft type masking jig 23, the shaft 13 can be used as it is. The shaft type masking jig 23 does not directly contact to the sealing fluid-side slope 10 of the seal lip 4 and does not directly cover the slope 10. However, the shaft type masking jig 23 contacts to the lip edge part 9 so as to separate the air-side slope 8 and the sealing fluid-side slope 10. Thus, the jig 23 substantially masks the sealing fluid-side slope 10.

Figure 8:
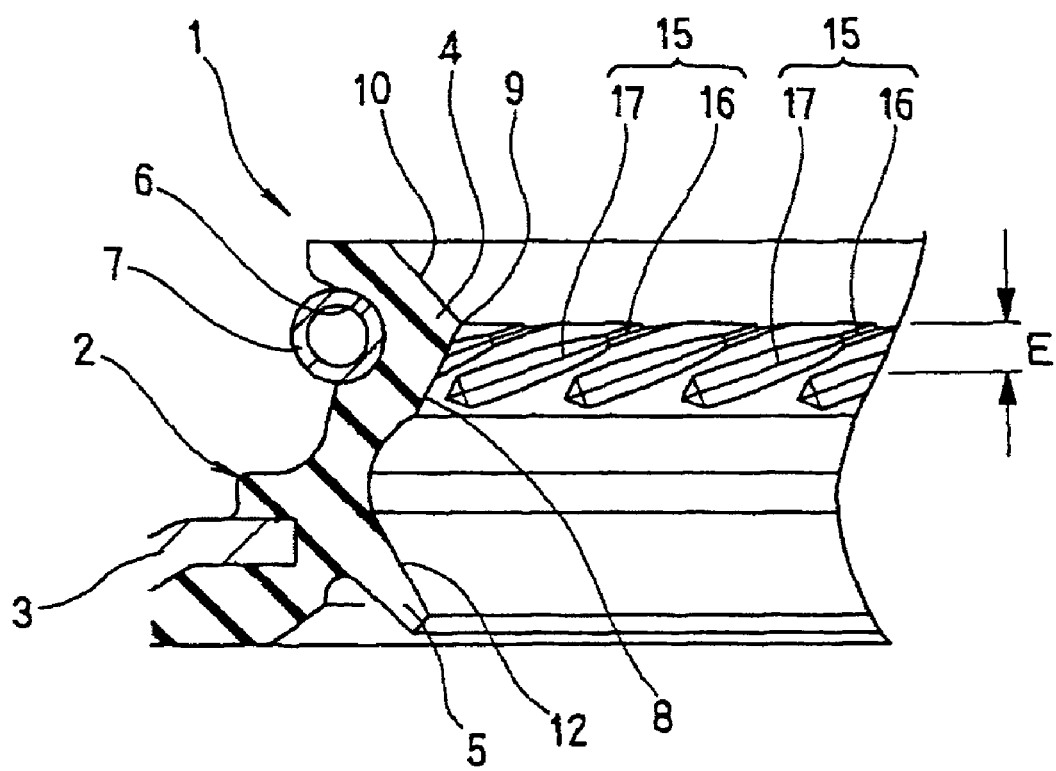
FIG. 8 is a cross sectional view of a main part of an oil seal according to another embodiment of the present invention.

Further, as for coating of the lip 4, a coating agent is applied on an as narrow range as possible from a top end of a sliding part on the air-side slope 8. In a case that the film thickness is thick, when a coating agent is applied on a large range, tensional force increases, and thus the effect to reduce torque by coating may be suppressed. Thus, as for the coating range, a coating agent should be applied on only a necessary portion (the abrading and diminishing range) For example, in an oil seal 1 including a male screw part 15 made by combining parallel projections 16 and ship bottom-shaped projections 17 on the air-side slope 8 of the lip 4 as illustrated in FIG. 8, the whole of the parallel projections 16 and a half part of the ship bottom-shaped projections 17 become a coating range E. A dimensional standard of the coating range E is 1.5 mm or less. As for the film thickness, a lip not having a screw has the thickness of 20 μm or less, and a lip having a screw has that equivalent to a height of a parallel screw thread or less (50±20 μm)

EXAMPLES

Example 1

(a) 50 weight parts of isocyanate group-containing 1,2 polybutadiene (NISSO TP1001 produced by NIPPON SODA CO., LTD., containing 50% butyl acetate)
(b) 50 weight parts of hydroxyl group-containing 1,2 polybutadiene (NISSO CQ1000 produced by NIPPON SODA CO., LTD., containing 55% xylene)
(c) 250 weight parts of a polyethylene resin (having a molecular weight of 2000, a melting point of 110° C., and a particle diameter of 1 μm; containing 85% toluene)
(d) 250 weight parts of polytetrafluoroethylene (having a particle diameter of 1 μm; containing 85% toluene)
(e) 1000 weight parts of toluene The above-described components were mixed, the mixed toluene solution was applied on a fluororubber, which was molded by compressing and vulcanizing, by spraying so as to have a thickness of 6 μm. The applied solution was subjected to a thermal treatment at 200° C. for 30 minutes. Then, the following dynamic friction measuring test, a friction and abrasion test, and a surface roughness measurement were carried out. Further, the toluene solution was partially applied on the air-side slope 8 of an oil seal (having an inner diameter of 85 mm, an outer diameter of 105 mm, and a width of 13 mm) made of a vulcanized fluororubber, the applied solution was subjected to a thermal treatment, and the sealing fluid-side slopes (the sealing fluid-side sliding face) 10 was formed by knife-cutting C. Then, the following oil seal rotating test (an oil seal friction torque measuring test) was carried out.

(A) Dynamic friction measuring test: As for 2 mm of a fluororubber sheet coated as described above, a dynamic friction coefficient was measured by using a surface tester (produced by SHINTO SCIENTIFIC CO., LTD.) and using a chromium steel ball frictional element having a diameter of 10 mm as an opposite material, according to JIS K7125, P8147, under conditions that a moving speed was 50 mm/minute and a load was 50 g.

(B) Friction and abrasion test: As for 2 mm of a fluororubber sheet coated as described above, a backwardly moving test was carried out by using a surface tester (produced by SHINTO SCIENTIFIC CO., LTD.) and using a stainless steel scratching needle having a diameter of 0.4 mm as an opposite material, according to JIS K7125, P8147, under conditions that a moving speed was 400 mm/minute, a reciprocatingly moving width was 30 mm, and a load was 300 g. Then, the abrasion state of a rubber surface after the test was observed by a microscope, and was determined by the following three stages.

○: The rubber base material was not exposed on the surface.

Δ: The coating agent was abraded, and a rubber base material on the abraded surface was partially exposed.

×: The coating agent was abraded, and a rubber material on the abraded surface was wholly exposed, or a rubber base material was abraded.

(C) Surface roughness: As for 2 mm of a fluororubber sheet coated as described above, a ten points average roughness $R_z$, was measured by using a surface roughness shape measuring apparatus (produced by TOYO PRECISION PARTS MFG CO., LTD.) according to JIS B0601.

(D) Oil seal friction torque measuring test: An oil seal (having an inner diameter of 85 mm, an outer diameter of 105 mm and a width of 13 mm) made of a vulcanized fluororubber was coated as described above. Initial friction torque immediately after start of the test and friction torque after one hour from start of the test were measured in the oil sealing state under conditions that testing temperature was 100° C. and the rotation speed was 200 rpm. Then, it was confirmed whether the oil leaks or not.

Example 2

(a) 100 weight parts of isocyanate group-containing 1,2 polybutadiene (TP1001; containing 50% butyl acetate)
(b) 250 weight parts of a polyethylene resin (having a molecular weight of 2000, a melting point of 110° C., and a particle diameter of 1 μm; containing 85% toluene)
(c) 250 weight parts of polytetrafluoroethylene (having a particle diameter of 1 μm; containing 85% toluene)
(d) 1000 weight parts of toluene The toluene liquid including the above-described components was applied and heated. Then, similar tests to those in Example 1 were carried out.

Example 3

The similar tests to those in Example 2 were carried out, except that the polyethylene resin was changed to be 50 weight parts and the polytetrafluoroethylene was changed to be 50 weight parts.

Example 4

The similar tests to those in Example 2 were carried out, except that the polyethylene resin was changed to be 500 weight parts and the polytetrafluoroethylene was changed to be 500 weight parts.

Measured results in the examples were shown in Table 1.

TABLE 1

| Examples | Dynamic Friction Coefficient | Friction and Abrasion Test | Surface Roughness $R_z$ (μm) | Oil Seal Rotating Test | | Existence of Oil Leak |
|---|---|---|---|---|---|---|
| | | | | Initial Torque (N · cm) | Torque after 1 hour from start of test (N · cm) | |
| 1 | 0.2 | ○ | 8 | 28 | 28 | None |
| 2 | 0.2 | ○ | 10 | 28 | 28 | None |
| 3 | 0.4 | ○ | 5 | 29 | 28 | None |
| 4 | 0.1 | ○ | 15 | 28 | 28 | None |

Comparative Example 1

The similar tests to those in Example 2 were carried out, except that the polyethylene resin was changed to be 30 weight parts and the polytetrafluoroethylene was changed to be 30 weight parts.

Comparative Example 2

The similar tests to those in Example 2 were carried out, except that the polyethylene resin was changed to be 600 weight parts and the polytetrafluoroethylene was changed to be 600 weight parts.

Comparative Example 3

(a) 100 weight parts of a polyesterpolyol resin (D6-439, produced by DAINIPPON INK AND CHEMICALS, INCORPORATED)
(b) 60 weight parts of a polyisocyanate resin (DN980, produced by DAINIPPON INK AND CHEMICALS, INCORPORATED)
(c) 100 weight parts of polytetrafluoroethylene (having a particle diameter of 5 μm)
(d) 350 weight parts of methylethylketone The methylethylketone solution including the above-described components was applied on a vulcanized fluororubber, which was molded by compressing, by spraying so as to have a thickness of 15 μm, and was subjected to a thermal treatment at 80° C. for 30 minutes. Then, the similar tests to those in Example 1 were carried out.

Comparative Example 4

The similar tests to those in Comparative example 3 were carried out, except that the polytetrafluoroethylene was changed to be 60 (50) weight parts, and 20 weight parts of molybdenum disulfide (UP-15, produced by Placer Dome Inc.), 5 weight parts of carbon black, and 1 weight part of a dispersant (EF-352, produced by TOHKEM PRODUCTS Corporation) were added in the methylethylketone solution to be applied.

Comparative Example 5

(a) 100 weight parts of a hydroxyl group-containing fluoroolefin-alkylvinylether copolymer resin (FLUONATE K-702, produced by DAINIPPON INK AND CHEMICALS, INCORPORATED)
(b) 12 weight parts of a polyisocyanate resin (DN980)
(c) 150 weight parts of polytetrafluoroethylene (having a particle diameter of 5 μm)
(d) 1000 weight parts of methylethylketone The methylethylketone solution includign the above-described components was applied, and heated.
Then, similar tests to those in Comparative example 3 were carried out.

Comparative Example 6

The similar tests to those in Comparative example 5 were carried out, except that the polytetrafluoroethylene was changed to be 130 weight parts, and 60 weight parts of silicone rubber powder (KMP594, produced by Shin-Etsu Chemical Co., Ltd.), and 130 weight parts of graphite (SGO-GB, produced by SEC CORPORATION LTD.) were added in the methylethylketone solution to be applied.

Comparative Example 7

(a) 50 weight parts of isocyanate group-containing 1,2 polybutadiene (TP1001; containing 50% butyl acetate)
(b) 50 weight parts of hydroxyl group-containing 1,2 polybutadiene (CQ1000; containing 55% xylene)
(c) 500 weight parts of a polyethylene resin (having a molecular weight of 2000, a melting point of 110° C., and a particle diameter of 1 μm; containing 85% toluene)
(d) 1000 weight parts of toluene The toluene solution including the above-described components was applied on a vulcanized fluororubber, which was molded by compressing, by spraying so as to have a thickness of 5 μm, and was subjected to a thermal treatment at 200° C. for 10 minutes. Then, the similar tests to those in Example 1 were carried out.

Comparative Example 8

(a) 600 weight parts of polytetrafluoroethylene (having a particle diameter of 1 μm; containing 85% toluene)
(b) 1000 weight parts of toluene The toluene solution including the above-described components was applied on a vulcanized fluororubber, which was molded by compressing, by spraying so as to have a thickness of 5 μm, and the solution was dried. Then, the similar tests to those in Example 1 were carried out.

Comparative Example 9

The similar tests to those in Example 1 were carried out, except that coating was not carried out.

Comparative Example 10

After the oil seal in Example 1 was knife-cut, the coating liquid in Example 1 was applied on the air-side slope (air-side sliding face) 8 and the sealing fluid-side slopes (the sealing fluid-side sliding face) 10, and was subjected to a thermal treatment. Then, the oil seal rotating test was carried out.

Measured results in the comparative examples were shown in Table 2.

TABLE 2

| Comparative Examples | Dynamic Friction Coefficient | Friction And Abrasion Test | Surface Roughness Rz (um) | Oil Seal Rotating Test | | Existence of Oil Leak |
| --- | --- | --- | --- | --- | --- | --- |
| | | | | Initial Torque (N · cm) | Torque after 1 hour from start of test (N · cm) | |
| 1 | 0.7 | X | 5 | 43 | 36 | Exist |
| 2 | 0.1 | Δ | 25 | 23 | 40 | None |
| 3 | 0.3 | X | 15 | 33 | 37 | Exist |
| 4 | 0.1 | X | 25 | 27 | 37 | Exist |
| 5 | 0.3 | X | 20 | 34 | 36 | Exist |
| 6 | 0.1 | X | 20 | 28 | 41 | None |
| 7 | 0.2 | X | 10 | 30 | 40 | None |
| 8 | 0.1 | X | 7 | 22 | 41 | None |
| 9 | 2.5 | X | 5 | 44 | 40 | None |
| 10 | 0.1 | ○ | 15 | 28 | 28 | Exist |

Accordingly, clearly from the measured results in Table 1 and Table 2, it is confirmed that the present invention has the above-described effects.

What is claimed is:

1. An oil seal comprising:
   a seal lip made of a rubber elastic material and provided with an air-side slope and a sealing fluid-side slope on both sides of a lip edge part,
   wherein the air-side slope has a coating film on the surface thereof, and a portion in contact with a shaft in the lip edge part is so made that a sealing fluid-side rubber part and an air-side coating film simultaneously contact with the shaft,
   wherein the coating film is formed of a coating agent for a vulcanized rubber comprising an organic solvent solution which includes 10 to 160 weight parts of a polyethylene resin and 10 to 160 weight parts of a fluororesin with respect to 100 weight parts of an isocyanate group containing 1,2-polybutadiene or a 1,2-polybutadiene mixture made by blending a hydroxyl group containing 1,2-polybutadiene with the isocyanate group containing 1, 2-polybutadiene and a solvent;
   a particle diameter of the fluororesin is 0.1 to 10 μm; and
   a coat thickness of the coating film is 2 to 7 μm.

* * * * *